Aug. 10, 1926.
H. L. GRAY
1,595,186
PLUG FOR GAS OR OIL WELL LINES
Filed Feb. 12, 1925
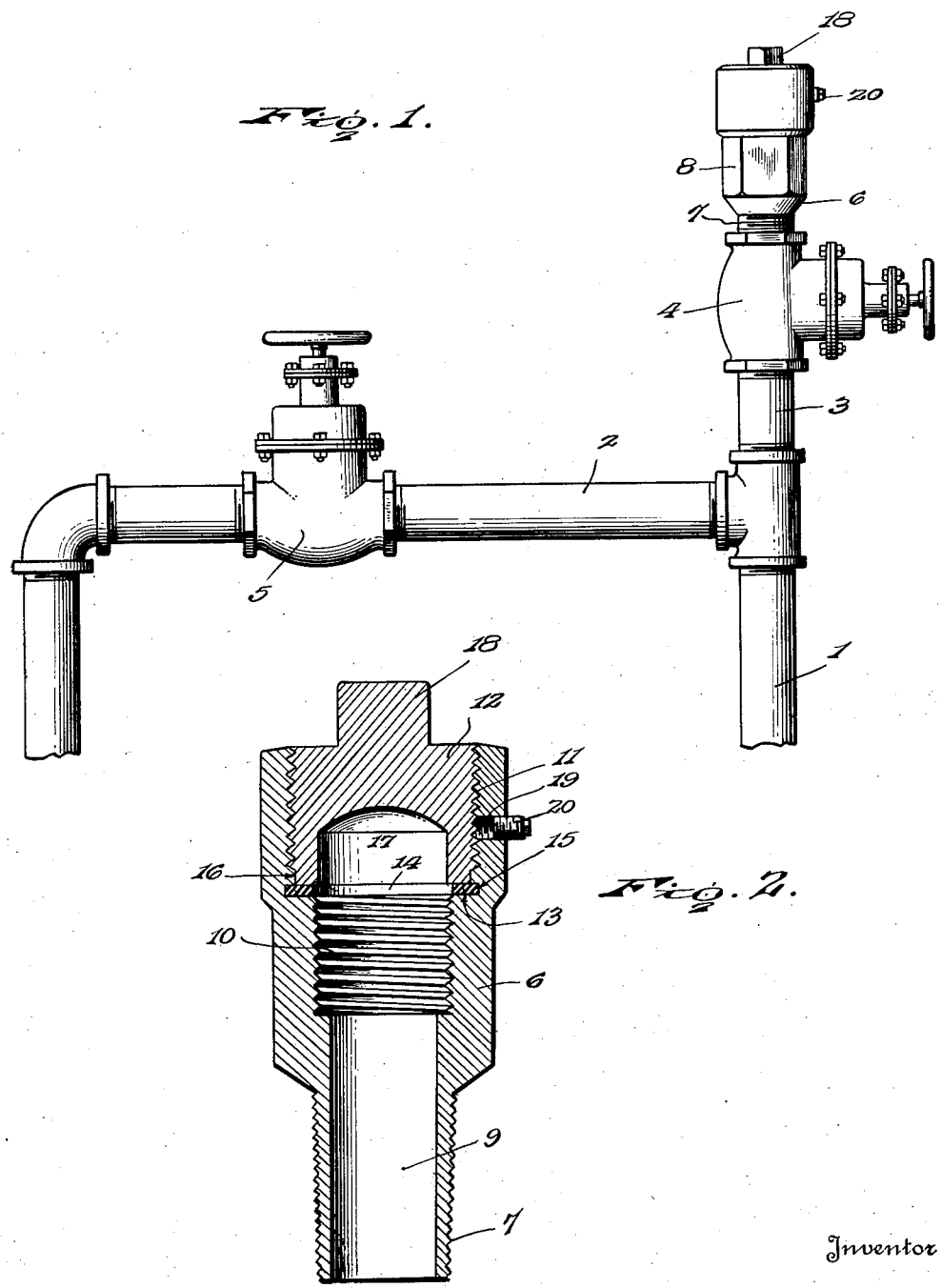
Inventor
H. L. Gray.
By Larry Gray, Attorney Patented Aug. 10, 1926.

1,595,186

UNITED STATES PATENT OFFICE.

HERMAN L. GRAY, OF JERUSALEM, OHIO, ASSIGNOR TO CLARENCE A. HARDWICK, OF BARNESVILLE, OHIO.

PLUG FOR GAS OR OIL WELL LINES.

Application filed February 12, 1925. Serial No. 8,750.

This invention is a plug for use upon gas or oil wells to eliminate leakage. It is common practice to equip high pressure gas or oil wells with a cut-off valve which is normally closed but may be opened at intervals as necessary in order to relieve the pressure in the well and prevent explosions or damage to some of the well casing or the pipe lines. After the cut-off valve has been opened a few times to relieve the pressure, it begins to leak and it has been found practically impossible to overcome such leakage. Obviously, leakage in the main controlling cut-off valve means a loss of fuel and a shortening of the productive life of the well, and it is, therefore, the object of my invention to provide means whereby the leakage at the blow-off valve will be neutralized and waste of fuel from the well will be prevented. This object is attained in the use of such a device as is illustrated in the accompanying drawing, and the invention resides in certain novel features which will be particularly pointed out in the appended claim.

In the drawing:

Figure 1 is an elevation of a portion of a gas well casing showing the connections of the same with a distributing system and showing my improved plug mounted thereon, and Fig. 2 is an enlarged section through the plug.

In the drawing, the reference numeral 1 indicates the casing of the well, 2 a branch leading therefrom to the fuel distributing system, and 3 the usual blow-off extension equipped with a cut-off valve 4 which is generally and preferably of the gate type. A cut-off valve 5 is also provided in the branch 2 in order that the flow through the branch may be arrested when it is desired to connect another line pipe to the branch beyond the valve. Leakage in the cut-off valve 5, however, is unimportant as any gas or oil which may leak past this valve will simply flow into the pipe lines and eventually will reach a point of use.

The blow-off extension 3 may pass through and beyond the valve 4 but usually will terminate at the valve. In carrying out my invention, I employ a casing 6 which has its lower end externally threaded, as shown at 7, whereby it may be engaged in the end of the casing of the cut-off valve opposite the end which is mounted upon the blow-off extension 3 of the well. Above the threaded portion 7, the casing 6 is flat-sided externally, as shown at 8, whereby it may be engaged by a wrench or other turning tool to be securely fitted in the casing of the valve 4. The bore of the casing 6 is smooth, as shown at 9, in its lower portion which passes through the threaded extremity 7, while in the upper portion of the flat-sided part of the casing the bore is enlarged somewhat and is internally threaded, as shown at 10. In the upper extremity of the casing, the bore is further enlarged and internally threaded, as shown at 11, whereby it is adapted to be engaged by and hold a cap plug 12. An annular shoulder 13 is produced at the upper end of the intermediate portion 10 of the bore, and this shoulder has a ground surface whereby it will receive and firmly support a gasket 14 of rubber or other compressible packing material. It will be noted particularly upon reference to Fig. 2 that the shoulder 13 is extended slightly into the wall of the uppermost portion of the bore, an annular groove 15 being thereby produced in the wall of the casing to receive and firmly hold the outer edge of the gasket or packing ring 14. A short smooth portion 16 is provided immediately above the groove 15 and the lower extremity of the cap plug 12 is externally smooth to mate with the surface 16 and form a ground joint therewith. The lower surface of the cap plug is also ground so that it will rest firmly upon the gasket and form a ground joint with the same so that leakage will be positively and effectually prevented. The lower portion of the cap 12 is formed with a cavity 17 whereby to reduce the weight and upon its upper or outer end is formed with a stud 18 having flat sides whereby it may be engaged with a wrench or turning tool. In the side of the casing 6 above the shoulder 13 a radial opening 19 is formed, said opening being threaded to receive a vent plug 20. When it is found necessary to relieve the pressure in the well, the vent plug 20 is first withdrawn, after which the cap plug 12 may be withdrawn entirely or simply raised so that its lower end will clear the opening 19. The cut-off valve 4 may then be opened and the oil or gas will escape through the vent opening 19 in an obvious manner. If it be desired or be necessary to lower tools within the well, the cap plug 12 is entirely withdrawn, and a nipple having its internal bore of the same diameter as the smooth portion 9 of the bore of the casing 6 is engaged in the said casing and secured by the threads 10. This nipple will be of sufficient length to project above the casing 6 so that any tools may be lowered through the casing and the well without causing any damage to the bore of the casing 6. The fitting of a nipple into the casing in the described manner is also advantageous when it is desired to test the flow in the well by inserting a flow gage.

My device is exceedingly simple in the construction and arrangement of its parts, may be readily applied to any gas or oil well, and will effectually overcome leakage and thereby prevent waste of fuel.

Having thus described the invention, I claim:

A plug for the purpose set forth comprising a casing having a bore smooth in its lower portion and internally threaded in its intermediate portion to receive a nipple, the said intermediate portion of the bore being of larger diameter than the lower smooth portion thereof and the diameter of the bore at the upper end thereof being greater than the diameter of said intermediate portion, an annular radial shoulder being defined between the intermediate and upper portions of the bore and the upper portion being threaded at its upper extremity and ground immediately above the shoulder, a cap plug threaded into the upper end portion of the bore and having its outer circumference smooth at its lower end to form a ground joint with the bore of the casing immediately above the annular shoulder, and a gasket fitted within the casing and resting on the annular shoulder and compressed against the shoulder by the lower extremity of the cap plug.

In testimony whereof I affix my signature.

HERMAN L. GRAY. [L. S.]